United States Patent
Kii et al.

(10) Patent No.: US 9,205,858 B2
(45) Date of Patent: Dec. 8, 2015

(54) TILT STEERING COLUMN DEVICE

(71) Applicant: NSK Ltd., Tokyo (JP)

(72) Inventors: Hiroyuki Kii, Maebashi (JP); Yoji Arai, Maebashi (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 14/234,647

(22) PCT Filed: Aug. 9, 2013

(86) PCT No.: PCT/JP2013/071645
§ 371 (c)(1),
(2) Date: Jan. 24, 2014

(87) PCT Pub. No.: WO2014/025011
PCT Pub. Date: Feb. 13, 2014

(65) Prior Publication Data
US 2015/0203146 A1     Jul. 23, 2015

(30) Foreign Application Priority Data
Aug. 9, 2012 (JP) ................................. 2012-176838

(51) Int. Cl.
*B62D 1/189*     (2006.01)
*B62D 1/184*     (2006.01)

(52) U.S. Cl.
CPC ................ *B62D 1/189* (2013.01); *B62D 1/184* (2013.01)

(58) Field of Classification Search
CPC ........ B62D 1/184; B62D 1/185; B62D 1/189; B62D 1/187; B62D 1/18; B62D 1/16
USPC .............................. 74/493, 492; 280/775, 779
See application file for complete search history.

(56) References Cited

U.S. PATENT DOCUMENTS

2002/0171235 A1* 11/2002 Riefe et al. .................... 280/775

FOREIGN PATENT DOCUMENTS

| JP | 11-115771 A | 4/1999 |
| JP | 2001-055151 A | 2/2001 |
| JP | 2005-001562 A | 1/2005 |
| JP | 2009-227181 A | 10/2009 |
| JP | 2010-254159 A | 11/2010 |
| JP | 2011-121443 A | 6/2011 |
| JP | 2011-214698 A | 10/2011 |
| JP | 2012035758 A * | 2/2012 |
| JP | 2012-096563 A | 5/2012 |

* cited by examiner

*Primary Examiner* — Keith Frisby
(74) *Attorney, Agent, or Firm* — Miles & Stockbridge P.C.

(57) ABSTRACT

A tilt steering column device is provided having construction in which a displacement bracket 16a is provided on the top side of the steering column 6a and that suppresses an increase in operation force for operating an adjustment lever even when the steering wheel 1 is located at the top end of the adjustment range. A wide section 33 having a width dimension that is larger than the width dimension in the forward-backward direction of an anchor section 25 or the top-half section of a pushing member 29 is provided in the top-end section of at least one long hole 17a of a pair of long holes 17a, 17b that are provided in support plate sections 15b, 15c.

6 Claims, 10 Drawing Sheets

TILT STEERING COLUMN DEVICE

TECHNICAL FIELD

The present invention relates to a tilt steering column device that is assembled in a steering apparatus for vehicle.

BACKGROUND ART

As illustrated in FIG. 5, a steering apparatus for vehicle is constructed so that the rotation of a steering wheel 1 is transmitted by way of a steering shaft 5, a universal joint 7, an intermediate shaft 8 and a universal joint 9 to an input shaft 3 of a steering gear unit 2; and as the input shaft 3 rotates, a pair of left and right tie rods 4 are pushed and pulled, which applies a steering angle to the front wheels. With the steering shaft 5 inserted in the axial direction through a cylindrical steering column 6, the steering column 6, which is supported by the vehicle body, supports the steering shaft 5 so as to be able to rotate freely. In the example illustrated in the figure, an electric power steering apparatus is assembled, and an electric motor 10, which is an auxiliary power supply, is supported by a housing that is fastened to the front-end section of the steering column 6.

A tilt mechanism for adjusting the height position of the steering wheel 1 according to the size and driving posture of the driver is assembled in a steering apparatus for vehicle. The construction of a steering apparatus provided with a tilt mechanism has been disclosed, for example, in JP 2009-227181 (A), JP 2010-254159 (A) and JP 2011-121443 (A). In the conventional construction illustrated in FIG. 5, the front-end section of the top of the housing 11 is supported by the vehicle body 12 by way of a tilt shaft 13 that is arranged in the width direction of the vehicle body 12 so as to be able to pivotally displace. Moreover, in the portion near the rear end of the middle section in the axial direction of the steering column 6, a support bracket 14 is equipped that is supported by the vehicle body 12 and that comprises a pair of support plate sections 15 that are separated in the width direction. The portion near the rear end of the middle section in the axial direction of the steering column 6 is held on both sides in the width direction by the pair of support plate sections 15, and in that state, is supported by the vehicle body 12 by way of the support bracket 14. A displacement bracket 16 is provided in a portion on the bottom surface of the middle section in the axial direction of the steering column 6 that is held by the pair of support plate sections 15.

Long holes 17 that extend in the up-down direction in an arc shape that is centered around the tilt shaft 13 are formed in both of the pair of support plate sections 15. Moreover, a through hole 18 is formed in a portion of the displacement bracket 16 that is aligned with part of the long holes 17. In the construction illustrated in FIG. 5, a tilt and telescopic mechanism that is able to adjust the forward-backward position in addition to the up-down position of the steering wheel 1 is assembled, so the through hole 18 is formed as a long hole that extends in the axial direction of the steering shaft 5 and steering column 6. Accordingly, the steering shaft 5 and steering column 6 comprise expandable and contractible construction.

FIG. 6 and FIG. 7 illustrate a tilt steering column device that is assembled in a steering apparatus comprising a tilt and telescopic mechanism having the construction disclosed in JP 2011-214698 (A). In this tilt steering column device, the steering column 6 is constructed such that the front-end section of an outer column 19 that is arranged on the rear side fits with the rear-end section of an inner column 20 that is arranged on the front side so as to be able to slide and so that the entire length can be expanded or contracted. The outer column 19 is manufactured by die-cast formation of a light metal alloy, for example, and a slit 21 is provided on the front end thereof so that the inner diameter of the outer column 19 can elastically expand or contract. A pair of held plate sections 22 that forms a displacement bracket 16 is provided in portions that are on both sides in the width direction of the slit 21. Through holes 18 are formed in the held plate sections 22 as long holes that extend in the forward-backward direction. A support bracket 14 comprises a top plate section 34 that is arranged above the steering column 6 and a pair of support plate sections 15 that are bent at right angles downward from both end sections in the width direction of the top plate section 34. Long holes 17 that extend in the up-down direction and have a partial arc shape that is centered around a tilt shaft 1 (see FIG. 5) are formed in the pair of support plate sections 15. A tilt rod member 23 such as a tilt bolt, a push-pull rod or the like is inserted in the width direction through the long holes 17 and through holes 18. The support bracket 14 is supported by a vehicle-side bracket 36, which is fastened to and supported by the vehicle body 12 (see FIG. 5), by way of a fastening member 35 that is welded and fastened to the top surface of the top plate section 34.

An adjustment lever 24, which is a tilt lever, is provided on one end section in the axial direction of the tilt rod member 23, an anchor section 25 is provided on the other end section in the axial direction of the tilt rod member 23, and a cam apparatus 26 is provided in the portion near one end of the middle section in the axial direction of the tilt rod member 23. With this kind of construction, a tilt-lock mechanism is formed that expands or contracts a space between the inside surfaces of the pair of support plate sections 15 based on the pivotal movement of the adjustment lever 24. The anchor section 25 has a circular plate shape such as the head of a bolt as a whole, and a first engagement convex section 27 is formed on the inside surface thereof. The first engagement convex section 27 engages with one of the long holes 17 (right hole in FIG. 7) and is able to displace only along the long hole 17. Therefore, the tilt rod member 23 is able to raise and lower along the long holes 17, but is unable to rotate around the axis thereof.

The cam apparatus 26 comprises a combination of a drive-side cam 28 and a driven-side cam 29 that functions as a pushing member. The drive-side cam 28 and the driven-side cam 29 are both formed entirely into a circular ring shape, and have center holes through which the tilt rod member 23 passes. The surfaces of the drive-side cam 28 and the driven-side cam 29 that face each other form cam surfaces (drive-side cam surface and driven-side cam surface) that are uneven in the circumferential direction. A second engagement convex section 30 is formed on the inside surface of the driven-side cam 29, and this second engagement convex section 30 engages with the other long hole 17 (left hole in FIG. 7) so as to be able to displace only along this long hole 17. Therefore, the driven-side cam 29 can be raised and lowered along the long hole 17, however, is unable to rotate around the axis thereof. Here, the "inside surface" is defined as the side surface that is near the center in the width direction of the steering column 6, and the "outside surface" is defined as the side surface that is near the outside in the width direction of the steering column 6. The drive-side cam 28 is joined and fastened to the base-end section of the adjustment lever 24, and is such that as the adjustment lever swings in reciprocation, the drive-side cam 28 rotates in reciprocation around the tilt rod member 23. A thrust bearing 32 is provided between the nut 31 that is screwed onto the other-end section of the tilt rod member 23 and the outside surface of the base-end section of the adjustment lever 24; and this thrust bearing 32 makes it possible for the drive-side cam 28 to pivot in reciprocation, while at the same time supports thrust loads that act on the drive-side cam 28. The nut 31 is prevented from becoming loose by crimping or the like.

When adjusting the position of the steering wheel 1, the dimension in the axial direction of the cam apparatus 26 is reduced, and the space between the driven-side cam 29 and the anchor section 25 is widened by pivotally moving the adjustment lever 24 in a specified direction (generally, downward). As a result, the surface pressure at the areas of contact between the inside surfaces of the pair of support plate sections 15 and the outside surfaces of the held plate sections 22 is decreased or lost, and the inner diameter of the front-end section of the outer column 19 is elastically expanded, and the surface pressure at the area of contact between the inner-circumferential surface of the front-end section of the outer column 19 and the outer-circumferential surface of the rear-end section of the inner column 20 is decreased. In this state, the up-down position and forward-backward position of the steering wheel 1 can be adjusted within the range that the tilt rod member 23 is able to move in the long holes 17 and through holes 18. After the steering wheel 1 has been moved to a desired position, by pivotally moving the adjustment lever 14 in the opposite direction (normally upward), the dimension in the axial direction of the cam apparatus 26 increases and the space between the inside surfaces of the support plate sections 15 is reduced, and as a result, the surface pressure at the areas of contact between the inside surfaces of the support plate sections 15 and the outside surfaces of the held plate sections 22 increases, the inner diameter of the front-end section of the outer column 19 elastically decreases, the surface pressure at the area of contact between the inner-circumferential surface of the front-end section of the outer column 19 and the outer-circumferential surface of the inner column 20 increases, and the steering wheel 1 is maintained at the adjusted position.

In addition to the mechanism illustrated in FIG. 6 and FIG. 7, various kinds of mechanisms are known that enable adjustment of the position of the steering wheel by adjusting the pressure force on the outside surfaces of a pair of support plate sections of a support bracket, or maintains the position of the steering wheel after adjustment. For example, a mechanism is known in which the tilt rod member is supported such that the tilt rod member can rotate around the center axis thereof. In this mechanism, a thrust bearing is provided between the anchor section 25 and outer surface of one of the support plate sections 15, and the base-end section of the adjustment lever 24 is joined and fastened to the other end section of the tilt rod member 23. Alternatively, construction is known in which the first engagement convex section 27 of the anchor section 25 engages with one of the long holes 17 so as to be able to displace only along the long hole 17, and the base-end section of the adjustment lever 24 is joined and fastened to a nut 31 that is screwed onto the other end section of the tilt rod member 23 and that functions as a pressure member. In this construction, by rotating the nut 31 with the adjustment lever 24, the space between the nut 31 and the anchor section 25 is increased or reduced.

In any construction, it is necessary that the engagement convex section be engaged with one of the long holes in at least one location so as to be able to displace along the long hole, and such that rotation centered around the tilt rod member is prevented. Moreover, in order to sufficiently ensure the force for keeping the steering wheel 1 in the adjusted position, it is necessary to maintain the surface pressure at the areas of contact between the inside surfaces of the pair of support plate sections 15 and the outside surfaces of the displacement bracket 16 after the space between the anchor section 25 and the pressure member such as the driven-side cam 29 has been reduced. In order to maintain the surface pressure at these areas of contact, it is necessary to definitely reduce the space of the portions of the pair of support plate sections 15 that hold the displacement bracket 16. As illustrated in FIG. 6 and FIG. 7, when the displacement bracket 16 is provided on the bottom side of the steering column 16, it is relatively easy to maintain the pressure at these areas of contact. The reason for this is that, even when the steering wheel 1 is positioned at the top end of the adjustment range, the portions of the pair of support plate sections 15 that hold the displacement bracket 16 are separated from the top ends of these support plate sections 15, and the moment that acts in a direction that brings the held portions closer to each other can be made to be relatively large.

On the other hand, in construction in which a displacement bracket is provided on the top side of the steering column, as disclosed in JP 2004-001562 (A), when the steering wheel is located on the top end of the adjustment range, it becomes difficult to ensure the surface pressure at the areas of contact between the inside surfaces of the pair of support plate sections and the outside surfaces of the displacement bracket. FIG. 8 to FIG. 10 illustrate an example of construction in which a displacement bracket 16a is provided on the top side of an outer column 19a of a steering column 6a. In this construction, the displacement bracket 16a does not protrude below the steering column 6a, so it is advantageous in improving the degree of freedom of design for protecting the knees of the operator during a collision accident.

However, when the steering wheel is positioned at the top end of the adjustment range, the displacement bracket 16a becomes located very close to the top-end section (base-end section) of the pair of support plate sections 15a of the support bracket 14a. When the space between the anchor section 25 and the driven-side cam 29 is reduced due to operation of the adjustment lever 24, the pair of support plate sections 15a displace around the respective top-end sections. The moment that acts on these support plate sections 15a becomes smaller toward the top-end sections of the support plate sections 15a, which are the centers of displacement of the support plate sections 15a. Therefore, in the construction illustrated in FIG. 8 to FIG. 10, when the trying to maintain the surface pressure at the areas of contact between the inside surfaces of the pair of support plate sections 15a and the outside surfaces of the displacement bracket 16a when the steering wheel is positioned at the top end of the adjustment range, the distance between the adjustment lever 24a and the top-end section of the pair of support plate sections 15a is short, and the moment that acts in a direction that would bring the support plate sections 15a closer to each other becomes small, so it is necessary to increase the operating force that is applied to the adjustment lever 24a. The large difference in the operating force for operating the adjustment lever 24 that occurs in this way due to the difference in the up-down position of the steering wheel 1 gives the operator that is operating the adjustment lever 24a an uncomfortable feeling, so is not desirable.

By employing construction in which the height dimension of the pair of support plate sections 15a is increased and it is possible to maintain the distance between the displacement bracket 16a and the top-end section of the support plate sections 15a even when the steering wheel 1 is positioned at the top end of the adjustment range, it is possible to lessen this uncomfortable feeling. However, in this construction, as long as the height of the portion on the vehicle body side where the support bracket 14a is assembled is the same, the installation position of the steering column 6a will be located further toward the bottom side, so except for cases in which there is plenty of installation space for the steering column device, employing this construction is difficult.

In the case of the construction disclosed in JP 2004-001562 (A), the top-half sections of the inside surfaces of the anchor section and driven-side cam are recessed when compared with the bottom-half sections thereof, or the portions around the top-end section of the long holes on the outside surfaces of the support plate sections are recessed. However, in the former construction, the assembly direction of the anchor section and the driven-side cam is limited, so the efficiency of the assembly work is lowered. On the other hand, in the case of the latter construction, not only does it become necessary to perform an extra process such as a surface pressing process for recessing the outside surfaces of the support plate sections, it also becomes necessary to perform a deburring process for removing burrs that occur during the pressing process, so the manufacturing cost increases.

RELATED LITERATURE

Patent Literature

[Patent Literature 1] JP 2009-227181 (A)
[Patent Literature 2] JP 2010-254159 (A)
[Patent Literature 3] JP 2011-121443 (A)
[Patent Literature 4] JP 2005-001562 (A)

SUMMARY OF INVENTION

Problem to be Solved by Invention

Taking in to consideration the situation described above, the object of the present invention is to provide a tilt steering column device that can be manufactured at low cost, and in which there are no large differences in the force required for operating the adjustment lever regardless of the up-down position of the steering wheel.

Means for Solving Problems

The tilt steering column device of the present invention comprises:
a steering column that pivotally displaces around a tilt shaft that is provided in the width direction in the front section thereof;
a displacement bracket that is fastened to the middle section in the axial direction of the steering column;
a steering shaft that is supported on the inner-diameter side of the steering column so as to be able to rotate freely;
a support bracket that comprises a top plate section that is supported by a vehicle body, and a pair of support plate sections that hangs downward from the top plate section, and that holds the support bracket from both sides in the width direction;
a pair of long holes that is provided in portions of the pair of support plate sections that are aligned with each other, and that extends in the up-down direction in a partial arc shape that is centered around the tilt shaft;
a through hole that is formed in a portion of the displacement bracket that is aligned with the pair of long holes so as to penetrate the displacement bracket;
a tilt rod member that is inserted through the pair of long holes and the through hole in the width direction;
an anchor section that is provided at the base-end section of the tilt rod member;
a tilt lever that is provided at the tip-end section of the tilt rod member; and
a pushing member that increases or reduces a space between the anchor section and the pushing member due to pivotal movement of the tilt lever; and
by increasing or reducing the space between the anchor section and the pushing member, the space between the inside surfaces of the pair of support plate sections is increased or reduced.

Particularly, in the tilt steering column device of the present invention, a wide section having a width dimension that is equal to or greater than and preferably greater than the width dimension in the forward-backward direction of the top-half section of the anchor section or pushing member is provided in the top-end section of at least one long hole of the pair of long holes. It is particularly preferred that the present invention be applied to a steering column device in which the displacement bracket is provided on the top side of the steering column. The top-half section of the anchor section or the pushing member means the half on the top sides of these members that overlap the wide section when viewed in the width direction when the tilt rod member is positioned at the very top-end section side inside the pair of long holes, and is set as the range of about 70% to 30% and preferably 60% to 40% of the top side of these members.

In one embodiment of the present invention, the wide section is provided on only the top-end section of the one long hole, and the top-end edge of the other long hole of the pair of long holes is located further on the bottom side than the top-end edge of the one long hole. When the tilt rod member is moved to the top end of the other long hole, the bottom half section of the anchor section or the pushing member is located further on the bottom side than the wide section. In other words, the bottom half section of the anchor section or the pushing member means the half on the bottom side of these members that does not overlap the wide section when viewed in the width direction when the tilt rod member is located at the very top-end section side inside the pair of long holes, and is set as the range of about 30% to 70% and preferably 40% to 60% of the bottom side of these members. Furthermore, in another embodiment of the present invention, wide sections are provided in the top-end sections of both of the pair of long holes. In this case, when the steering wheel has been moved to the top end position of the adjustment range, preferably a method for regulating the amount that the tilt rod member is raised is provided so that the bottom half section of the anchor section or pushing member is located further on the bottom side than the wide sections.

Effect of Invention

With the present invention, a tilt steering column device is provided in which there is no large difference in the force required to operate the adjustment lever regardless of the up-down position of the steering wheel. In other words, even when the steering wheel is positioned at the top end of the adjustment range and the displacement bracket is located in a portion near the top-end section of the pair of support plate sections of the support bracket, the top half portion of at least one of the anchor section and pushing member does not come in contact with the outside surfaces of the support plate sections because of the existence of wide sections that are provided in the top-end section of the long holes. Therefore, only the bottom half section of at least one of the anchor section and pushing member, which is separated a little from the top-end section of the support plate sections, pushes the one support plate section toward the other support plate section.

The bottom half section of the anchor section and pushing member is separated a certain amount from the top-end section of the support plate sections, which is the center of displacement of the support plate sections, so even when the height position of the steering wheel is at the very top side, the moment that acts on the support plate sections from the bottom half section of the anchor section and pushing section can be ensured to a certain extent without becoming too small. There are wide sections between the portions of the support plate sections that are pressed by the bottom half section of the anchor section and the pushing member and the top-end sections of the support plate sections, and the rigidity of the support plate sections in the portions where the wide sections exit decreases by an amount corresponding to the dimension of the wide sections. Therefore, even when the steering wheel is positioned at the top end of the adjustment range, there is no particular need to increase the operation force that is applied to the adjustment lever for maintaining the surface pressure at the areas of contact between the inside surfaces of the pair of support plate sections and the outside surfaces of the displacement bracket, and it is possible to lessen any uncomfortable feeling experienced by the operator when operating the adjustment lever. Moreover, the rigidity of the support plate sections decreases only the minimum necessary amount in the portions where the wide sections are located, so the rigidity of the overall support plate sections is not lost.

Furthermore, the wide sections can be easily formed by punching with a press at the same time that the long holes are formed. The assembly direction of the anchor section and the pushing member is not limited. Therefore, the manufacturing cost of the tilt steering column device of the present invention does not become high.

MODES FOR CARRYING OUT INVENTION

Figure 5:
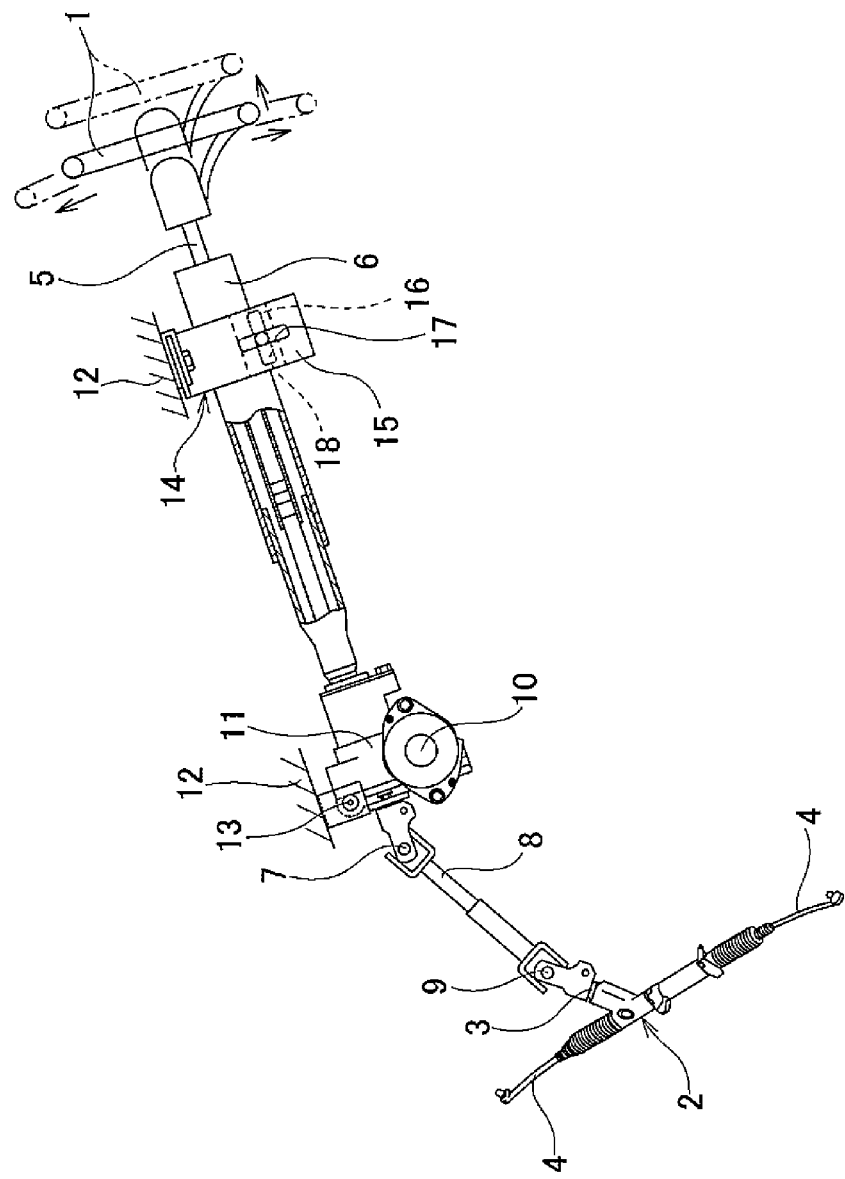
FIG. 5 is a partial cut-away side view illustrating an example of conventional construction of a steering apparatus for vehicle in which a tilt steering apparatus is assembled.

FIG. 1 to FIG. 4 illustrate an example of an embodiment of the present invention. In the construction of this example, in addition to a tilt mechanism for adjusting the up-down position of the steering wheel 1 (see FIG. 5), there is also a telescopic mechanism for adjusting the forward-backward position. The tilt steering column device of this example, comprises: a steering column 6a that pivotally displaces around a tilt shaft 13 (see FIG. 5) that is provided in the width direction in the front section; a displacement bracket 16a that is fastened to the middle section in the axial direction of the steering column 6a; a steering shaft 5 to which the steering wheel 1 is fastened to the rear-end thereof that protrudes from the opening on the rear end of the steering column 6a; a support bracket 14b that comprises a top plate section 34a that is located above the steering column 6a and that is supported by the vehicle body by way of a fastening member 35a, and a pair of support plate sections 15b, 15c, the top-end sections thereof being welded and fastened at two locations in the width direction to the bottom surface of the top plate section 34a so as to hang downward from the top plate section 34a, and so as to hold the displacement bracket 16a from both sides in the width direction; a pair of long holes 17a, 17b that are provided in portions of the pair of support plate sections 15b, 15c that are aligned with each other, and that extend in the up-down direction in a partial arc shape that is centered around the tilt shaft 13; a through hole 18 that is formed in a portion of the displacement bracket 16a that is aligned with the pair of long holes 17a, 17b so as to penetrate the displacement bracket 16a; a tilt rod member 23 that is inserted in the width direction though the pair of long holes 17a, 17b and through hole 18; an anchor section 25 that is provided at the base-end section of the tilt rod member 23; an adjustment lever 24, which functions as a tilt lever that is provided on the tip-end section of the tilt rod member 23; and a driven-side cam 29, which functions as a pushing member that increases or reduces the space between the driven-side cam 29 and the anchor section 25 based on the pivoting movement of the adjustment lever 24a. In the construction of this example, by increasing or reducing the space between the anchor section 25 and the driven-side cam 29, the space between the inside surfaces of the pair of support plate sections 15b, 15c is increased or reduced. By increasing or reducing the space between the inside surfaces of the pair of support plate sections 15b, 15c, it is possible for the steering column 6a to displace in the up-down direction.

Particularly, the tilt steering column device of this example comprises construction in which the displacement bracket 16a is provided on the top side of the outer column 19a of the steering column 6a, however, in order to keep the operating force for operating the adjustment lever 24a from becoming large even when the steering wheel 1 is positioned at the top end of the adjustment range, this tilt steering column device is characterized by having a wide section 33 formed at the top-end section of the long hole 17a. The basic construction of the tilt steering column device and steering apparatus in which this tilt steering column device is assembled is the same as the conventional construction. The same reference numbers are used for parts that are the same as in the conventional construction, and any redundant explanations are omitted or simplified, such that this explanation centers on the features of this example.

Of the long holes 17a, 17b that are formed in portions of the pair of support plate sections 15b, 15c of the support bracket 14b that are aligned with each other, a wide section 33 is formed in the top-end section of the long hole 17a that engages with the anchor section 25 of the tilt rod member 23. The wide section 33 is such that the width dimension thereof in the forward-backward direction is larger than the width dimension from the middle section to the bottom-end section of the long hole 17a. On the other hand, in this example, a wide section 33 is not formed on the top-end edge of the long hole 17b that engages with the second engagement convex section 30 that is formed so as to protrude in the width direction from the inside surface of the driven-side cam 29, and except for the portion where corner R sections are formed in the top-end section and bottom-end section, the width dimension of the long hole 17b is the same over the entire length. In other words, the width dimension in the forward-backward direction from the middle section to the bottom-end section of the long hole 17a and the width dimension in the forward-backward direction of the long hole 17b are both a little larger than the width dimension in the forward-backward direction of the first engagement convex section 27 that is provided on the inside surface of the anchor section 25 and the second engagement convex section 30 that is provided on the inside surface of the driven-side cam 29, by an amount such that the first engagement convex section 27 and second engagement convex section 30 are able to displace only along the long holes 17a, 17b; and the width dimension in the forward-backward direction of the inside surface of the driven-side cam 29 is sufficiently larger than the width dimension in the forward-backward direction of the long hole 17b, especially in the middle section of the driven-side cam 29. On the other hand, in a state in which the second engagement convex section 30 of the driven-side cam 29 that fits around the tilt rod member 23 is moved to the top end of the long hole 17b where the wide section 33 is not formed, the width dimension in the forward-backward direction of the wide section 33 is at least equal to, or preferably greater than, the width dimension in the forward-backward direction of the inside surface of the top-half section of the anchor section 25 that overlaps the wide section 33 when viewed in the width direction.

Moreover, the top-end edge of the long hole 17b in which a wide section is not formed is located further on the bottom side than the top-end edge (top edge of the wide section 33) of the long hole 17a in which the wide section 33 is formed. The position of the top-end edge of the long hole 17a, the position of the top-end edge of the long hole 17b and the positional relationship of these top-end edges are set so that, when the second engagement convex section 30 of the driven-side cam 29 that is fitted around the tilt rod member 23 is moved to the top end of the long hole 17b where the wide section 33 is not formed, the bottom half section of the anchor section 25 is located further on the bottom side than the wide section 33, and the top-end section of the anchor section 25 is located further on the bottom side than the top edge of the wide section 33. In other words, in this state, the bottom half section of the anchor section 25, when viewed in the width direction, does not overlap the wide section 33. The bottom half section of the anchor section 25 is set to be within the range of about 30% to 70%, and preferably within the range of about 40% to 60% of the bottom side of the anchor section 25. Therefore, the top-half section of the anchor section 25 is set to within the range of about 70% to 30%, and preferably within the range of about 60% to 40%.

Figure 1:
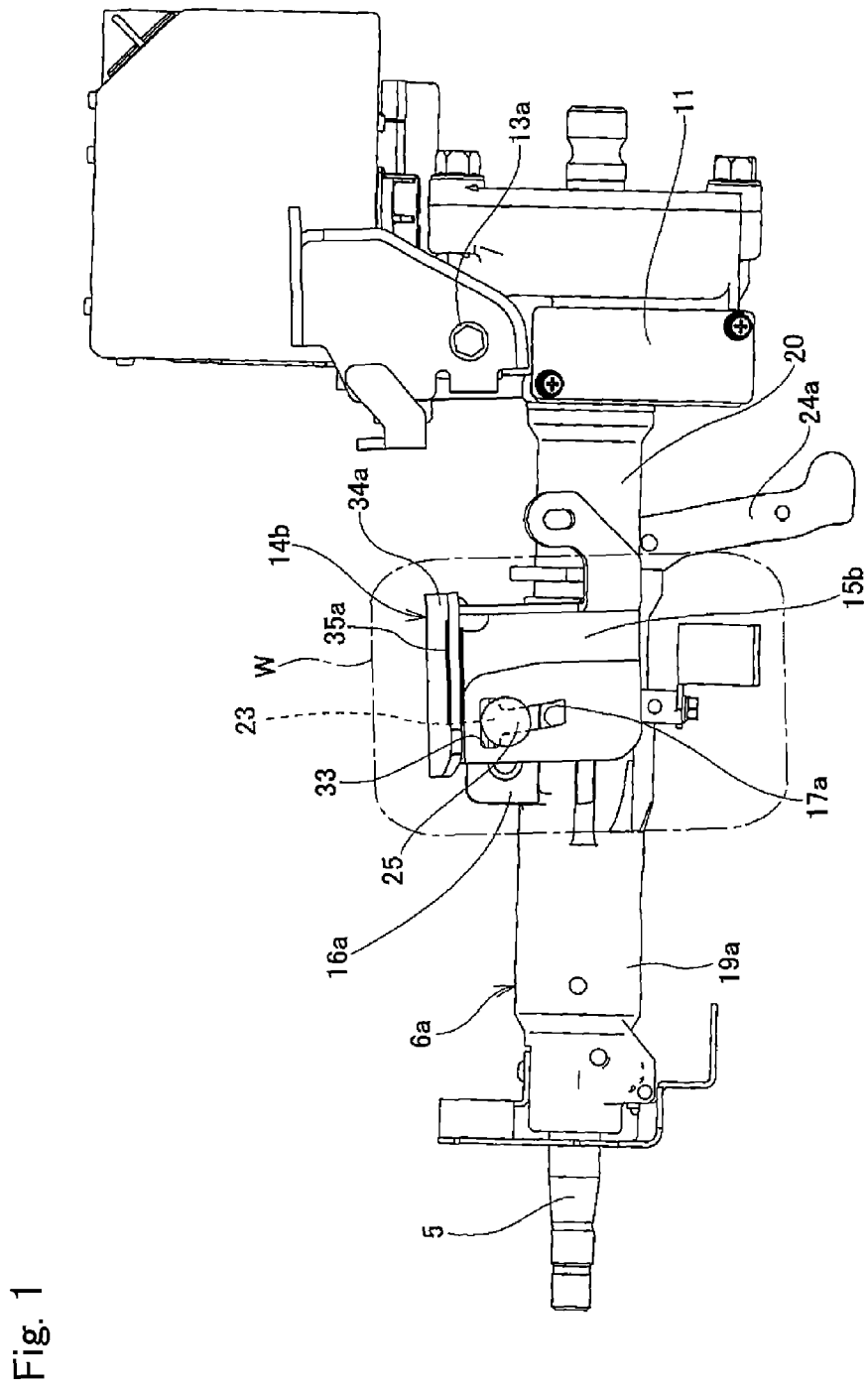
FIG. 1 is a side view illustrating a tilt steering apparatus of an example of an embodiment of the present invention.
Figure 2:
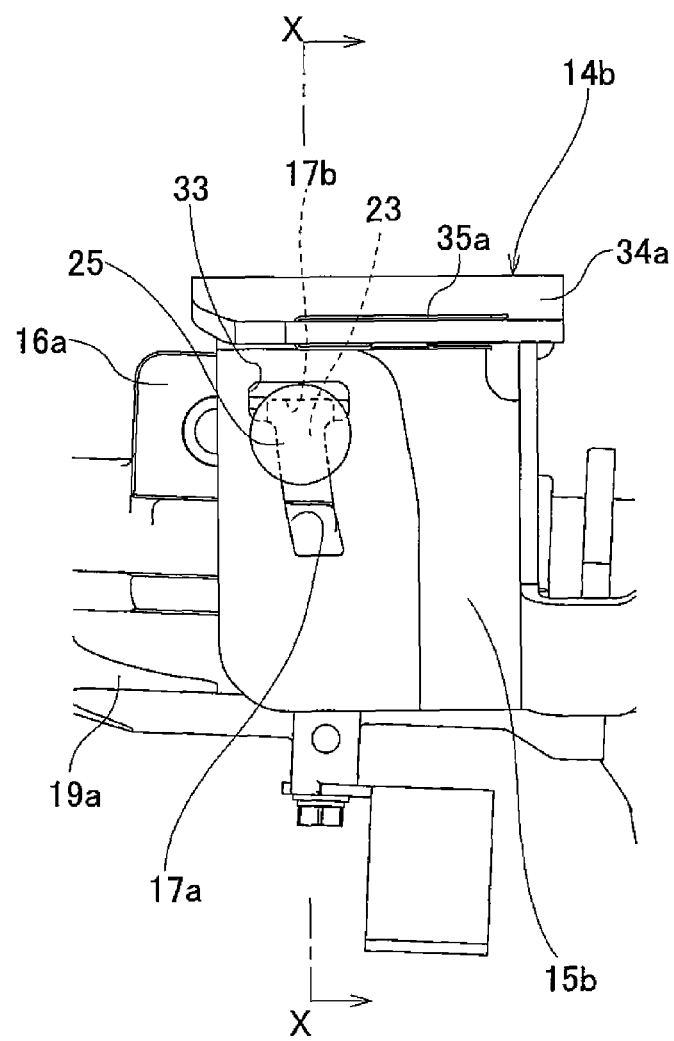
FIG. 2 is an enlarged view of part W in FIG. 1.
Figure 3:
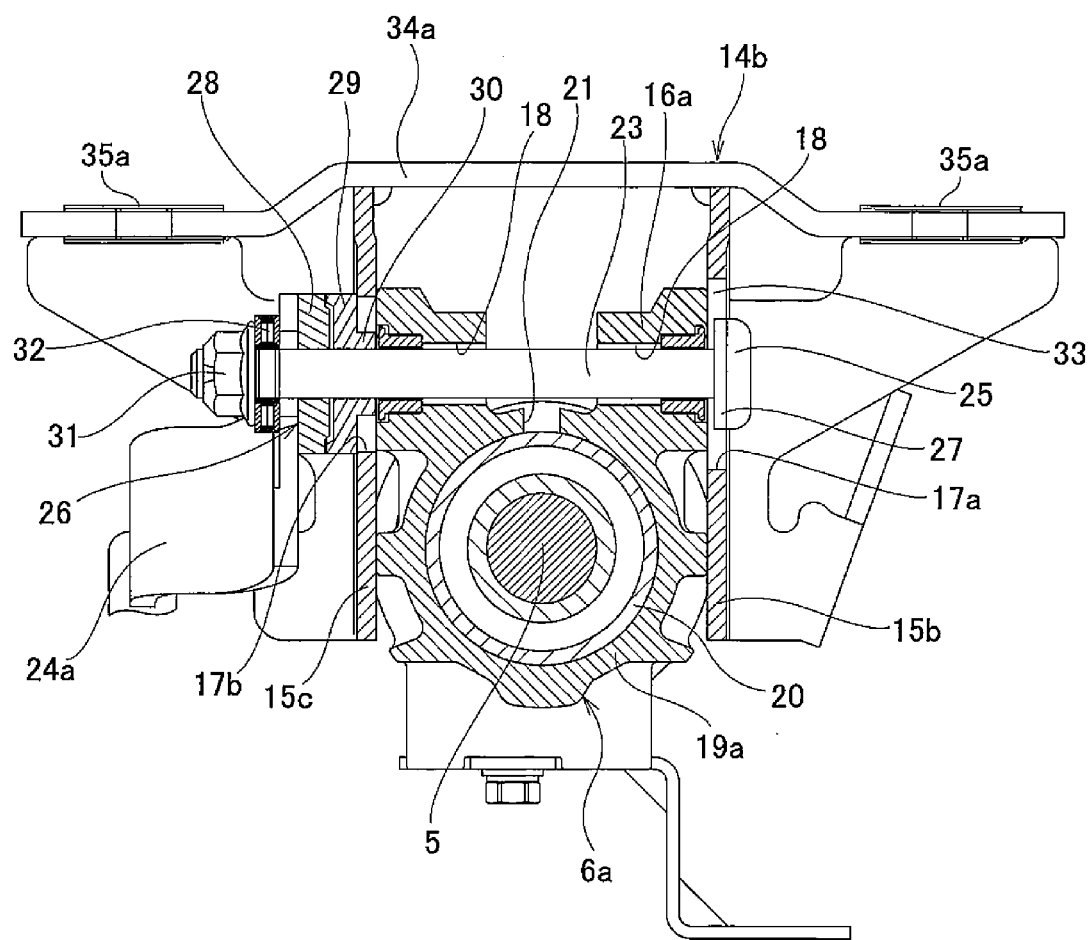
FIG. 3 is a cross-sectional drawing of section X-X in FIG. 2.
Figure 4:
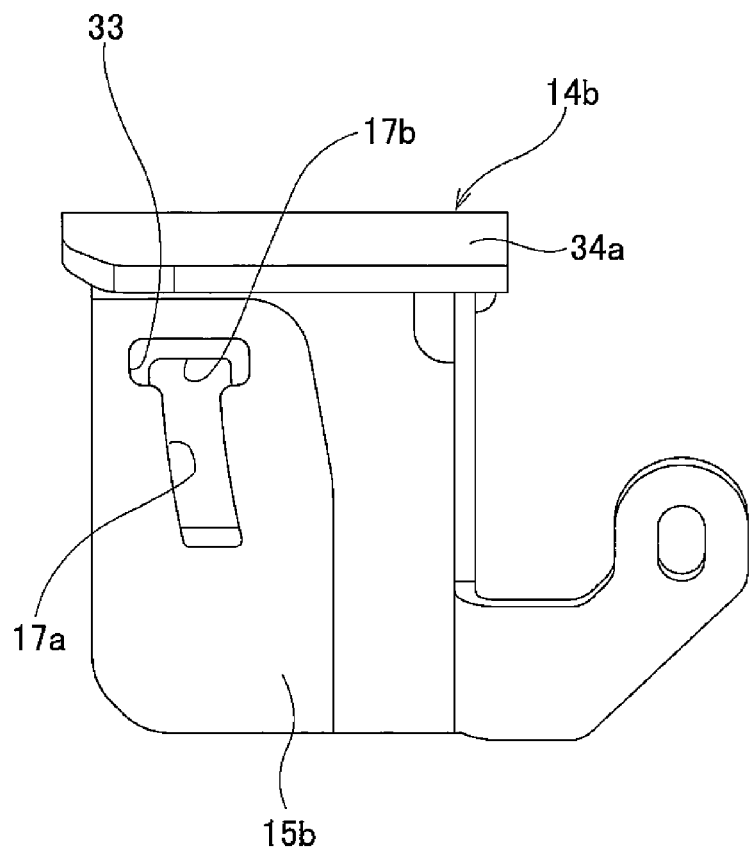
FIG. 4 is a side view of a support bracket that is assembled in the apparatus in FIG. 1.

With the construction of this example, regardless of the up-down position of the steering wheel 1, it is possible to keep large differences in the force required for operating the adjustment lever 24a from occurring. In other words, when the steering wheel 1 is positioned at the top end of the adjustment range, the top-end section of the engagement convex section 30 comes in contact with the top-end edge of the long hole 17b where a wide section is not formed, and so the tilt rod member 23 cannot be raised any higher than that. In this state, as illustrated in FIG. 1 and FIG. 2, the top-half section of the anchor section 25 that is provided on the base-end section of the tilt rod member 23 faces the wide section 33 that is provided on the top-end section of the long hole 17a. Therefore, the top-half section of the anchor section 25 does not push the outside surface of the support plate 15b in which the long hole 17a is formed. From this aspect, preferably, the width dimension in the forward-backward direction of the wide section 33 is 1 to 1.5 times, and more preferably, 1.05 to 1.2 times the maximum width dimension in the forward-backward direction of the top-half section of the anchor section 25 (maximum width dimension in the forward-backward direction of the portion where that inside surface does not come in contact with the outside surface of the support plate 15 when the second engagement convex section 30 is moved to the top end of the long hole 17b where the wide section 33 is not formed). Moreover, the height dimension of the wide section 33 is about 1 to 1.5 times, and preferably, 1.05 to 1.2 times the height dimension of the top-half section of the anchor section 25.

Figure 8:
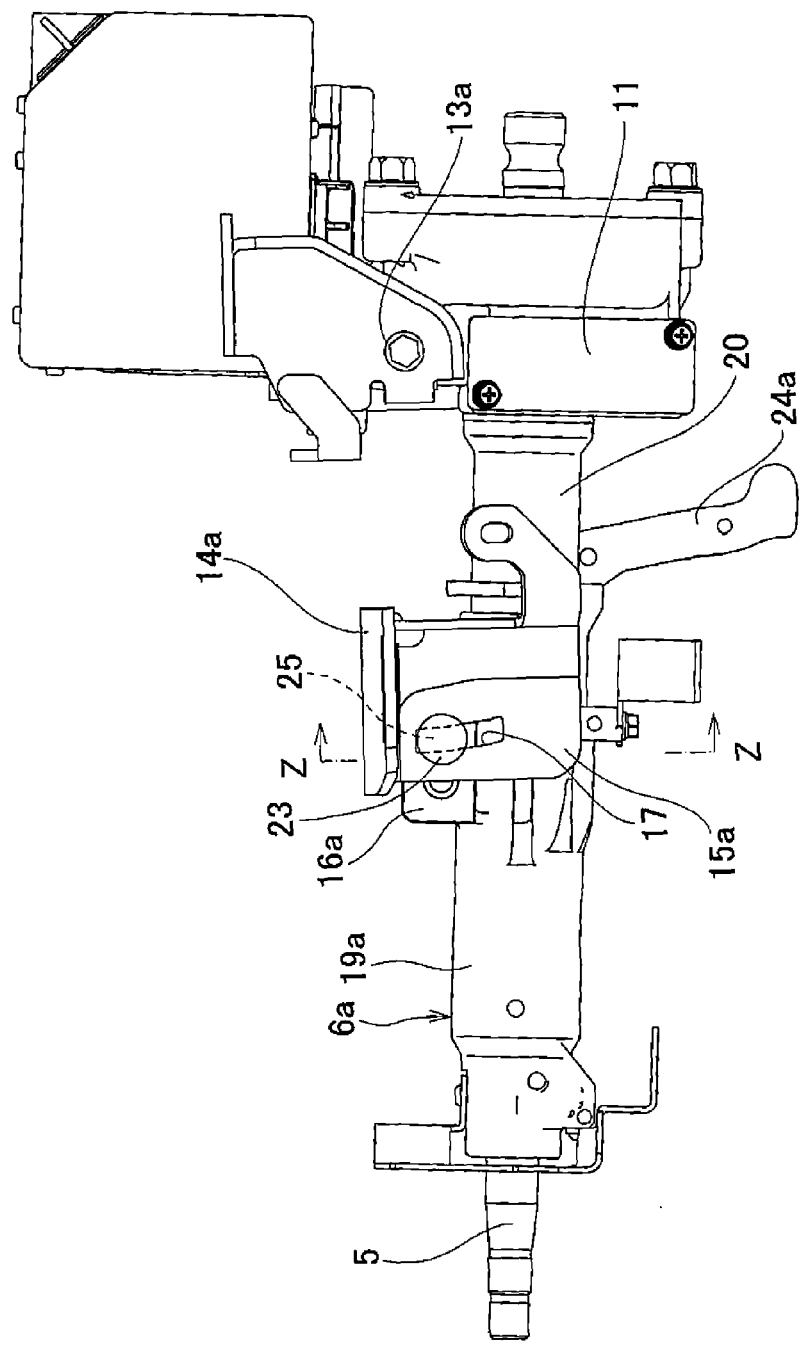
FIG. 8 is a side view illustrating the main parts of a second example of conventional construction of a tilt steering apparatus.
Figure 9:
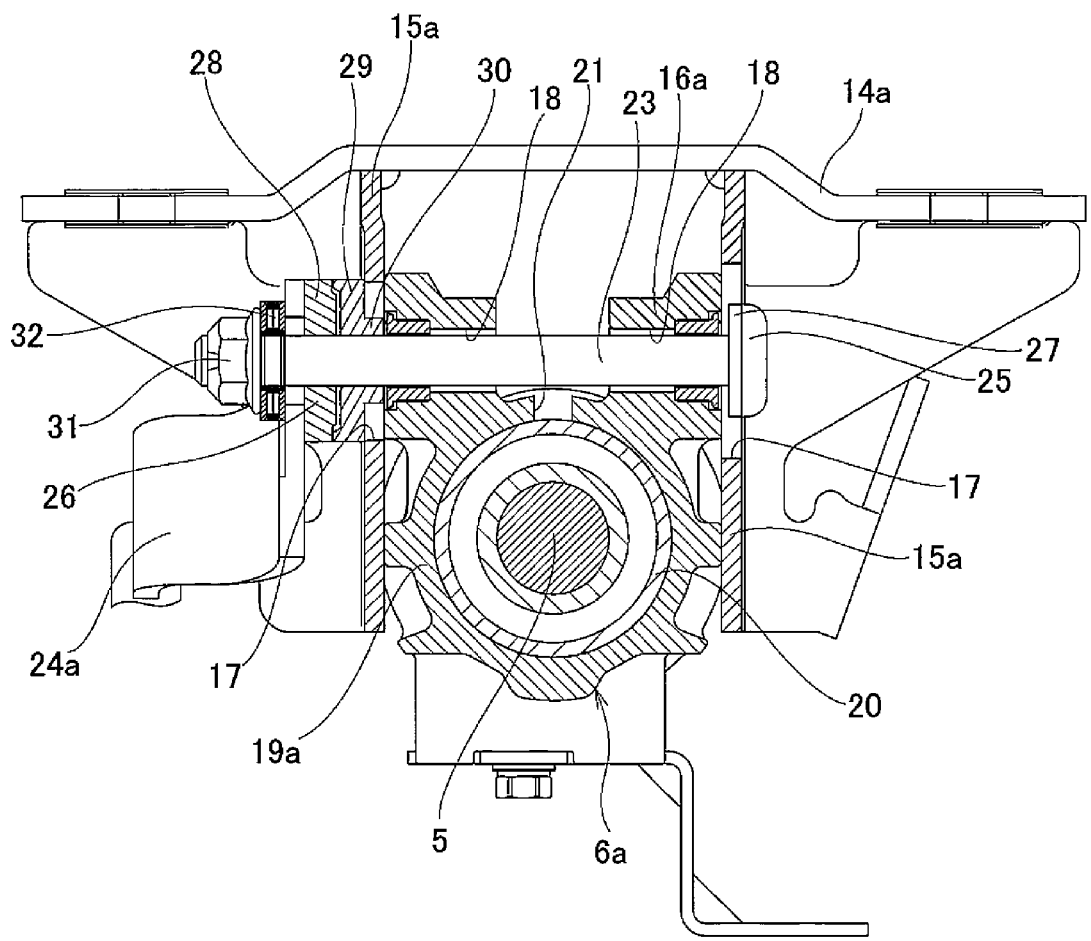
FIG. 9 is a cross-sectional drawing of section Z-Z in FIG. 8, in which part is omitted.
Figure 10:
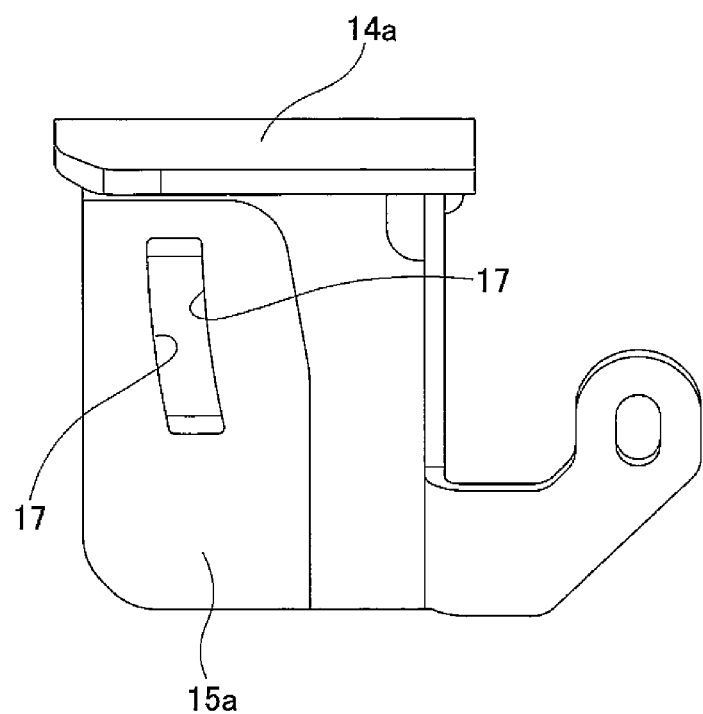
FIG. 10 is a side view of a support bracket that is assembled in the apparatus in FIG. 8.

From this state, when the dimension in the axial direction of the cam apparatus 26 is increased by operation of the adjustment lever 24 in order to maintain the steering wheel 1 in the top-end position or a position near the top-end position after adjustment, the tilt rod member 23 is pulled, and part of the bottom half section of the anchor section 25 is pushed against the portions on both sides of the long hole 17a of the outside surfaces of the top part of the support plate 15b and on the bottom side of the wide section 33. The portion on the bottom side of the wide section 33 that is pushed by the bottom half section of the anchor section 25 is separated a certain amount from the top-end section of the support plate 15b, which is the center of displacement of the support plate 15b, so the moment acting on the support plate 15b can be ensured a certain amount. In other words, in this example, when compared with the conventional construction illustrated in FIG. 8 to FIG. 10, it is possible to keep the moment acting in a direction that brings the pair of support plate sections 15b, 15c closer to each other sufficiently large. Moreover, in the portions of the support plate 15b that are pushed by the bottom half section of the anchor section 25, the edges on both the front and rear sides of the long hole 17a become non-continuous by providing the wide section 33, so that the portions are projected so as to form a corner shape and the rigidity of the portions is low. Furthermore, the wide section 33 is located between this portion and the top-end section of the support plate 15b, and the rigidity of the support plate 15b is lowered by an amount corresponding to the dimension of the wide section 33.

Therefore, even in a state in which the steering wheel 1 is positioned at the top end of the adjustment range, the portions on the bottom side of the wide section 33 of the inside surface of the support plate 15b are strongly pushed against the outside surface on one side of the displacement bracket 16a. As a reaction to this, the inside surface of the other support plate 15c and the outside surface on the other side of the displacement bracket 16a come in strong contact with each other. In this way, it is possible to maintain surface pressure at the areas of contact between the inside surfaces of the support plate sections 15b, 15c and the outside surfaces of the displacement bracket 16a in order to maintain the steering wheel 1 at the top end position after adjustment without particularly having to increase the operation force that is applied to the adjustment lever 24a, and thus the uncomfortable feeling that the operator experiences when operating the adjustment lever 24a due to large differences in the operation force for operating the adjustment lever 24a is lessened. In this example, by providing a wide section 33 at the top-end section of the long hole 17a of one of the support plate sections 15b, the uncomfortable feeling is lessened, so a decrease in the rigidity of the support plate 15b is kept to a minimum. In other words, it is possible to sufficiently maintain the rigidity of one support plate 15b, and it is also possible to maintain the support rigidity of the overall tilt steering column device.

Furthermore, the wide section 33 can be easily formed at the same time that the long hole 17a is formed in the support plate 15b by a punching process using a press. The assembly direction of the tilt rod member 23, on which the anchor section 25 is provided, and driven-side cam 29 is not limited. Therefore, the manufacturing cost of the tilt steering column device of this example does not become high. Moreover, in this example, the width of the long hole 17b that engages with the second engagement convex section 30 is narrow to the top-end section. Therefore, the function for stopping rotation by the second engagement convex section 30 is sufficiently maintained, and even when a large moment is applied when the adjustment lever 24a is rotated in order to maintain the position of the steering wheel 1 after adjustment, it is definitely possible to prevent rotation of the driven-side cam 29.

Figure 6:
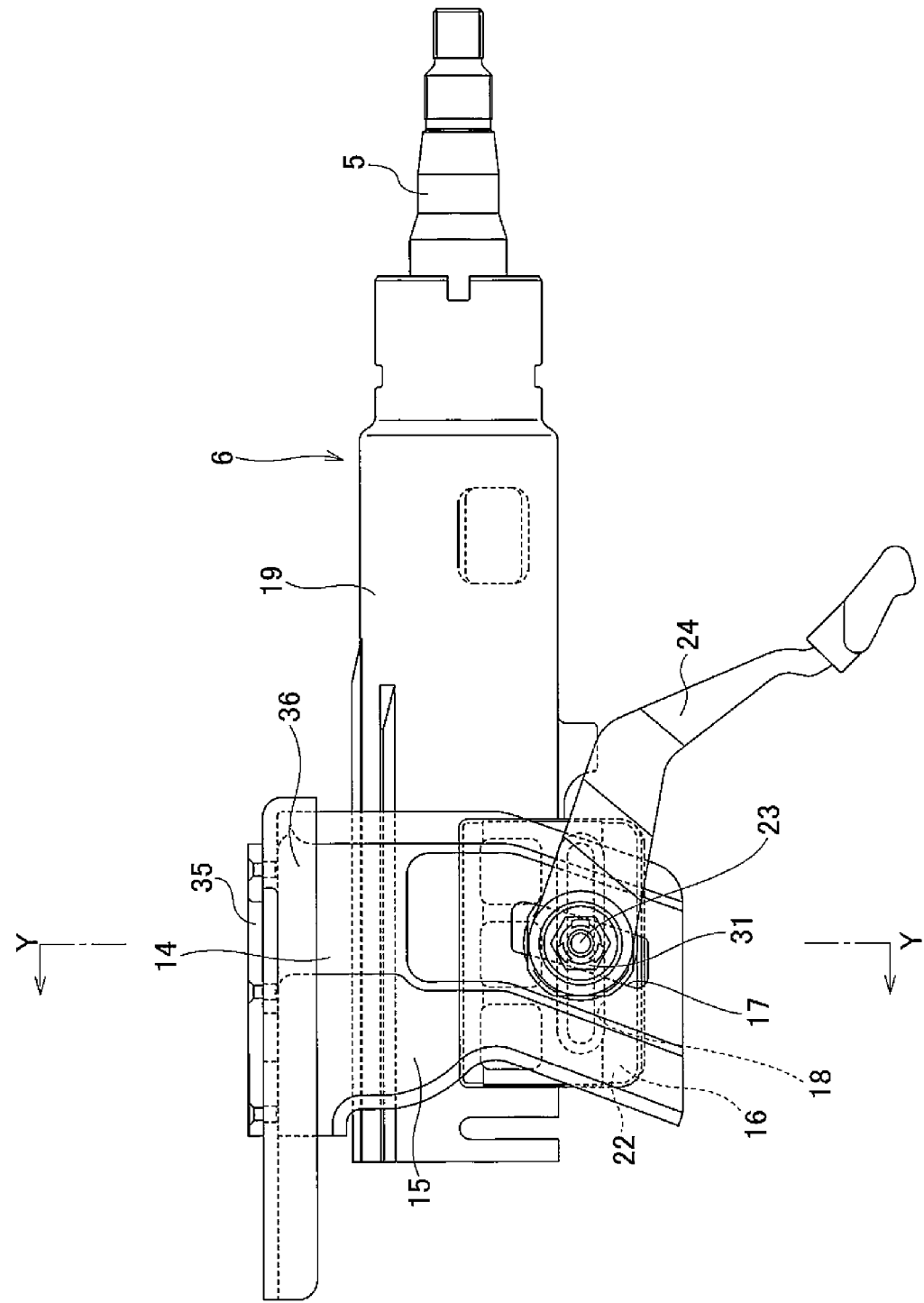
FIG. 6 is a side view illustrating the main parts of a first example of conventional construction of a tilt steering apparatus.
Figure 7:
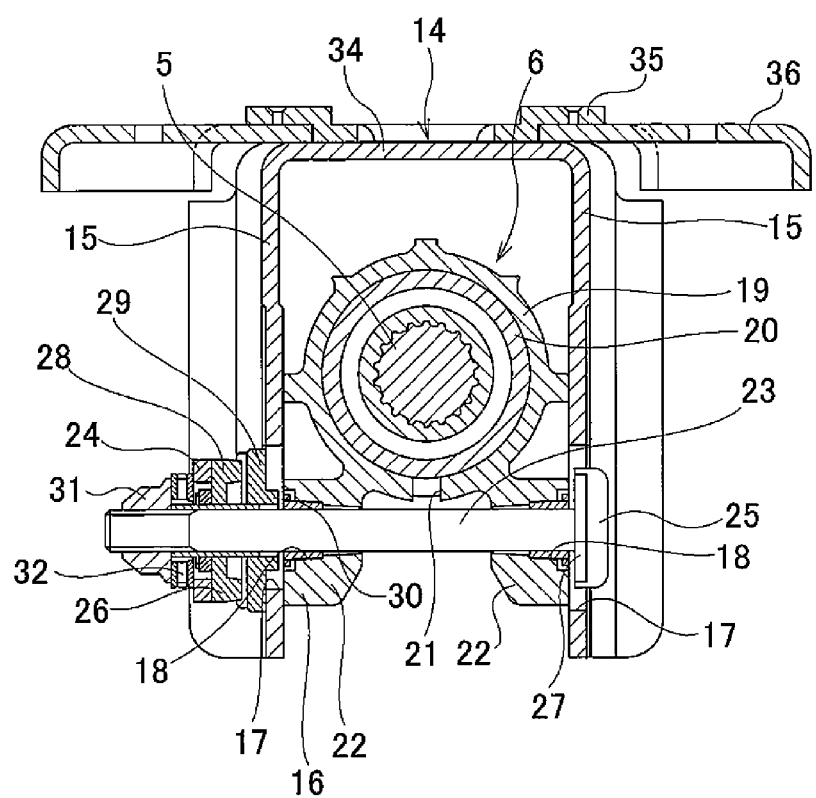
FIG. 7 is a cross-sectional drawing of section Y-Y in FIG. 6.

The effect of the present invention can remarkably be obtained by construction in which the displacement bracket 16a is provided on the top side of the steering column 6a, as in the construction of this example. However, the effect can be obtained to a certain extent by applying the present invention even in the case of construction in which the displacement bracket 16 is provided on the bottom side of the steering column 6 as illustrated in FIG. 6 and FIG. 7. In other words, the present invention can also be applied to construction in which a displacement bracket is provided on the bottom side of the steering column.

Moreover, in the example in the figures, the wide section 33 is provided only at the top-end section of the long hole 17a with which the anchor section 25 of the tilt rod member 23 is engaged, however, alternatively, it is also possible to provide a wide section only at the top-end section of the long hole 17b on the side where the adjustment lever 24a is installed (in the example in the figures, with which the driven-side cam 29 is engaged). In this way, by providing a wide section 33 at the top-end section of the one of the long holes 17a, 17b, in addition to keeping the rigidity of the support plate sections 15b, 15c where the long holes 17a, 17b are formed low, it is possible to obtain the function and effect of the present invention. In this case, with the steering wheel 1 moved to the top adjustable position, construction for properly regulating the positional relationship between the anchor section 25 or driven-side cam 29, which is a pushing member, and the wide section 33 can be easily achieved.

However, by providing wide sections 33 at the top-end sections of the long holes 17a, 17b, the function and effect of the present invention can be more notably obtained. In the case where wide sections 33 are provided in both long holes 17a, 17b, or in other words, when the positions in the up-down direction of the top-end edges of the long holes 17a, 17b coincide and the steering wheel 1 is moved to the top-end position of the adjustment range, a regulation method for regulating the amount the tilt rod member 23 is raised is necessary in order that the bottom half section of the anchor section 25 and the driven-side cam 29, which is a pushing member, are located further on the bottom side than the wide sections 33. As this kind of regulation method, construction is possible, for example, in which at least one of the anchor section 25 and driven-side cam 29, which is a pushing member, comes in contact with the bottom surface of the top section (installation plate section) of the support bracket 14b that is supported by the vehicle body, or comes in contact with a stopper that protrudes from the outside surfaces of the support plate sections 15b, 15c.

In any case, when a wide section 33 is formed in the top-end sections of the long holes 17a, 17b that engage with the portions of the anchor section 25 and the driven-side cam 29, which is a pushing member, that must be prevented from rotating, the height dimension of the wide sections 33, and the width dimension of the remaining portions are appropriately regulated so that the rotation prevention function is not hindered by the existence of the wide sections 33. That is, convex sections for forming the rotation prevention mechanism of these members must have a sufficient height dimension and engage with the portions of the long holes 17a, 17b on the bottom side of the wide sections 33 with good precision, and so that looseness in the width dimension is suppressed.

The present invention is not limited to this example, and it is possible to apply the invention to construction in which a thrust bearing is provided between the anchor section and the outside surface of one of the support plate sections, and in which the base-end section of the adjustment lever is joined and fastened to the other end section of the tilt rod member, and that tilt rod member is supported such that rotation around the center axis thereof is possible; or it is possible to apply the invention to construction in which, a first engagement convex section of the anchor section engages with one long hole such that displacement is possible only along the long hole, and the base-end section of the adjustment lever is joined and fastened to a nut that is screwed on the other end section of the tilt rod member and that functions as an pushing member, and by rotating the nut by using the adjustment lever, the space between the nut and the anchor section is increased or reduced. In the case of either construction, the wide section of this example is provided in the long hole on the anchor section side. Moreover, construction can also be applied such as in the conventional construction illustrated in FIG. 6 and FIG. 7 in which a support bracket is formed such that a pair of support plate sections 15 that are integrally formed with a top plate section 34 are bent and extend downward from both end sections in the width direction of the top plate section 34.

INDUSTRIAL APPLICABILITY

The present invention can be applied to not only a tilt steering apparatus that is capable of adjusting only the height position of a steering wheel, but can also be widely applied to tilt and telescopic steering apparatuses that are capable of adjusting the forward-backward position of a steering wheel in addition to the height position.

EXPLANATION OF REFERENCE NUMBERS

1 Steering wheel
2 Steering gear unit
3 Input shaft
4 Tie rod
5 Steering shaft
6, 6a Steering column
7 Universal joint
8 Intermediate shaft
9 Universal joint
10 Electric motor
11 Housing
12 Vehicle body
13, 13a Tilt shaft
14, 14a, 14b Support bracket
15, 15a, 15b, 15c Support plate
16, 16a Displacement bracket
17, 17a, 17b Long hole
18 Through hole
19, 19a Outer column
20 Inner column 21 Slit
22 Held plate section
23 Tilt rod member
24, 24a Adjustment lever
25 Anchor section
26 Cam apparatus
27 First engagement convex section
28 Drive-side cam
29 Driven-side cam
30 Second engagement convex section
31 Nut
32 Thrust bearing
33 Wide section
34, 34a Top plate section
35, 35a Fastening member
36 Vehicle-side bracket

What is claimed is:

1. A tilt steering column device, comprising:
a steering column that pivotally displaces around a tilt shaft that is provided in a width direction thereof in a front section thereof;
a displacement bracket that is fastened to a middle section in an axial direction of the steering column;
a steering shaft that is supported on an inner-diameter side of the steering column so as to be able to rotate freely;
a support bracket that comprises a top plate section that is supported by a vehicle body, and a pair of support plate sections that hang downward from the top plate section, and that are located on both sides in the axial direction of the support bracket;
a pair of long holes that is provided in portions of the pair of support plate sections that are aligned with each other, and that extends in the up-down direction in a partial arc shape that is centered around the tilt shaft;
a through hole that is formed in a portion of the displacement bracket that is aligned with the pair of long holes so as to penetrate the displacement bracket;
a tilt rod member that is inserted through the pair of long holes and the through hole in the width direction;
an anchor section that is provided at a base-end section of the tilt rod member;
a tilt lever that is provided at a tip-end section of the tilt rod member; and
a pushing member that increases or reduces a space between the anchor section and the pushing member due to pivotal movement of the tilt lever; and
by increasing or reducing the space between the anchor section and the pushing member, a space between inside surfaces of the pair of support plate sections is increased or reduced, and
a wide section having a width dimension that is equal to or greater than a width dimension in a forward-backward direction of a top-half section of the anchor section or pushing member is provided in a top-end section of at least one long hole of the pair of long holes.

2. The tilt steering column device according to claim 1, wherein the displacement bracket is provided on a top side of the steering column.

3. The tilt steering column device according to claim 2, wherein the wide section is provided on only the top-end section of the one long hole, and the top-end edge of the other long hole of the pair of long holes is located further on a bottom side than a top-end edge of the one long hole, and with the tilt rod member moved to the top-end section of the other long hole, a bottom half section of the anchor section or pushing member is located further on the bottom side than the wide section.

4. The tilt steering apparatus according to claim 2, wherein the wide section is provided in the top-end sections of both of the pair of long holes.

5. The tilt steering column device according to claim 1, wherein the wide section is provided on only the top-end section of the one long hole, and the top-end edge of the other long hole of the pair of long holes is located further on a bottom side than a top-end edge of the one long hole, and with the tilt rod member moved to the top-end section of the other long hole, a bottom half section of the anchor section or pushing member is located further on the bottom side than the wide section.

6. The tilt steering apparatus according to claim 1, wherein the wide section is provided in the top-end sections of both of the pair of long holes.

* * * * *